(12) United States Patent
Atsatt

(10) Patent No.: US 11,334,696 B2
(45) Date of Patent: May 17, 2022

(54) SYSTEMS AND METHODS FOR DYNAMIC VOLTAGE AND FREQUENCY SCALING IN PROGRAMMABLE LOGIC DEVICES

(71) Applicant: Intel Corporation, Santa Clara, CA (US)

(72) Inventor: Sean R. Atsatt, Santa Cruz, CA (US)

(73) Assignee: Intel Corporation, Santa Clara, CA (US)

( * ) Notice: Subject to any disclaimer, the term of this patent is extended or adjusted under 35 U.S.C. 154(b) by 1005 days.

(21) Appl. No.: 15/718,993

(22) Filed: Sep. 28, 2017

(65) Prior Publication Data

US 2019/0095564 A1 Mar. 28, 2019

(51) Int. Cl.
*H03K 19/003* (2006.01)
*G06F 30/30* (2020.01)
*H03K 19/17764* (2020.01)
*H03K 19/1776* (2020.01)
*H03K 19/17736* (2020.01)
*H03K 19/17768* (2020.01)
*G06F 30/34* (2020.01)
*G06F 30/396* (2020.01)
(Continued)

(52) U.S. Cl.
CPC .............. *G06F 30/30* (2020.01); *G06F 30/34* (2020.01); *H03K 19/1774* (2013.01); *H03K 19/1776* (2013.01); *H03K 19/17764* (2013.01); *H03K 19/17768* (2013.01); *G06F 30/396* (2020.01); *G06F 2119/06* (2020.01); *G06F 2119/12* (2020.01)

(58) Field of Classification Search
CPC ........ G06F 30/30; G06F 30/34; G06F 30/396; G06F 2119/06; G06F 2119/12; H03K 19/1774; H03K 19/1776; H03K 19/17764; H03K 19/17768
See application file for complete search history.

(56) References Cited

U.S. PATENT DOCUMENTS 6,895,566 B1 * 5/2005 Chan ................... G01R 31/2856
714/725
9,229,054 B2 1/2016 Bowman et al.
(Continued)

OTHER PUBLICATIONS

Zhao, Shuze, et al., A Universal Self-Calibrating Dynamic Voltage and Frequency Scaling (DVFS) Scheme with Thermal Compensation for Energy Savings in FPGAs, May 12, 2016, pp. 1-6, Long Beach, CA, USA.

*Primary Examiner* — Kurtis R Bahr
(74) *Attorney, Agent, or Firm* — Fletcher Yoder, P.C.

(57) ABSTRACT

A system, may include a processor configured to receive circuit design data, identify one or more critical paths of the circuit design data, and generate one or more synthetic tunable replica circuits (STRCs) that may mimic the one or more critical paths. The processor may then compile the circuit design data and the one or more STRCs into program data. The system may also include an integrated circuit including a control circuit that may receive the program data from the processor, program a plurality of programmable logic regions of the integrated circuit to implement the circuit design data and the one or more STRCs, and adjust one or more operating parameters of at least one of the plurality of programmable logic regions based on the one or more STRCs.

21 Claims, 7 Drawing Sheets

(51) Int. Cl.
*G06F 119/06* (2020.01)
*G06F 119/12* (2020.01)

(56) References Cited

U.S. PATENT DOCUMENTS

| | | | |
|---|---|---|---|
| 2008/0191768 A1* | 8/2008 | Miki | H03K 5/1565 327/175 |
| 2010/0182055 A1* | 7/2010 | Rozen | H03K 5/133 327/155 |
| 2010/0299557 A1* | 11/2010 | Bull | G06F 1/10 714/10 |
| 2014/0015562 A1* | 1/2014 | Dwivedi | G11C 7/22 324/762.03 |
| 2014/0167812 A1* | 6/2014 | Jain | G06F 30/30 326/16 |
| 2016/0179186 A1* | 6/2016 | Toh | G06F 1/3206 713/322 |
| 2017/0272073 A1* | 9/2017 | Betz | G06F 30/34 |
| 2017/0299651 A1* | 10/2017 | Clerc | H03K 5/133 |
| 2018/0024837 A1* | 1/2018 | Sadowski | G06F 9/3836 712/226 |

\* cited by examiner

SYSTEMS AND METHODS FOR DYNAMIC VOLTAGE AND FREQUENCY SCALING IN PROGRAMMABLE LOGIC DEVICES

BACKGROUND

This disclosure relates to controlling power consumption with respect to different regions of an integrated circuit. More specifically, the disclosure relates to controlling the clock frequency and voltage input provided to different regions of a programmable logic device, such as a field programmable gate array (FPGA) device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

An integrated circuit that contains programmable logic fabric provides a highly flexible platform that can be configured after manufacturing with a custom circuit design. The flexibility and variability in the possible designs that may be programmed into this type of integrated circuit, however, also provides for different regions of the integrated circuit to be used for different purposes and functions. As the integrated circuit is programmed to perform various operations, each region of the integrated circuit may have a corresponding critical path that is a function of the user's design. As such, managing the power and performance parameters of each region of different integrated circuits may involve specifically coordinated techniques.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure relates generally to improving power consumption and/or performance in an integrated circuit and, more particularly, to reducing power consumption in certain regions of the integrated circuit. In certain embodiments, power management techniques, such as dynamic voltage and frequency scaling operations, may involve controlling a clock frequency of a region of an integrated circuit and/or controlling a voltage input provided to the region of the integrated circuit. That is, different regions of the integrated circuit may be capable of operating or performing its specified application using a clock frequency that is less than a nominal frequency specified for the region or the integrated circuit, thus enabling the region to operate at lower voltages without significantly compromising its performance capabilities. As a result, the region of the integrated circuit and the integrated circuit itself may recover a significant portion of its power.

To incorporate dynamic voltage and frequency scaling techniques in programmable integrated circuits, the critical paths of each region of the integrated circuit may be identified based on an analysis of a user's design of each region of the integrated circuit. After identifying the critical paths of an integrated circuit based on the user design, the embodiments described herein may include creating synthetic tunable replica circuits (STRCs) that mimic the identified critical paths. The created STRCs may be programmed into unused FPGA logic and circuit components of the integrated circuit based on the user's design. In some embodiments, the insertion of the STRCs into the integrated circuit may involve simultaneously inserting the STRCs with the user's circuit design if there is not enough unused logic to create them.

After an STRC is stored in a region of the integrated circuit, a control circuit within the respective region of the integrated circuit may tune or calibrate the STRC to represent the critical paths of the respective region. In some embodiments, a calibration design may be created to calibrate the STRCs with respect to the real critical paths of the actual circuit paths of the user's circuit design. The calibration design may include heater circuits, such that the STRCs may be swept across various voltages, frequencies, and temperature values. After tuning the STRC, the control circuit may monitor the performance of the STRC over a frequency sweep and record the behavior of the critical path over frequency. As a result, the control circuit may generate a table that quantifies the behavior of the critical path over frequency without knowledge of the voltage and temperature characteristics of the region of the integrated circuit.

With the foregoing in mind, while the region of the integrated circuit is performing a respective operation via its critical path, the control circuit may determine whether the clocking frequency or voltage provided to the region may be reduced without compromising the region's performance based on the recorded behavior. Based on the recorded behavior, the control circuit may adjust the clocking frequency of the region to reduce the overall power consumed by the integrated circuit. In addition to reducing the power consumption of the integrated circuit, the control circuit may employ STRCs to detect anomalies that may occur within the integrated circuit, detect attacks from perpetrators outside of the integrated circuit, improve end-of-life parameters for the integrated circuit, and the like.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
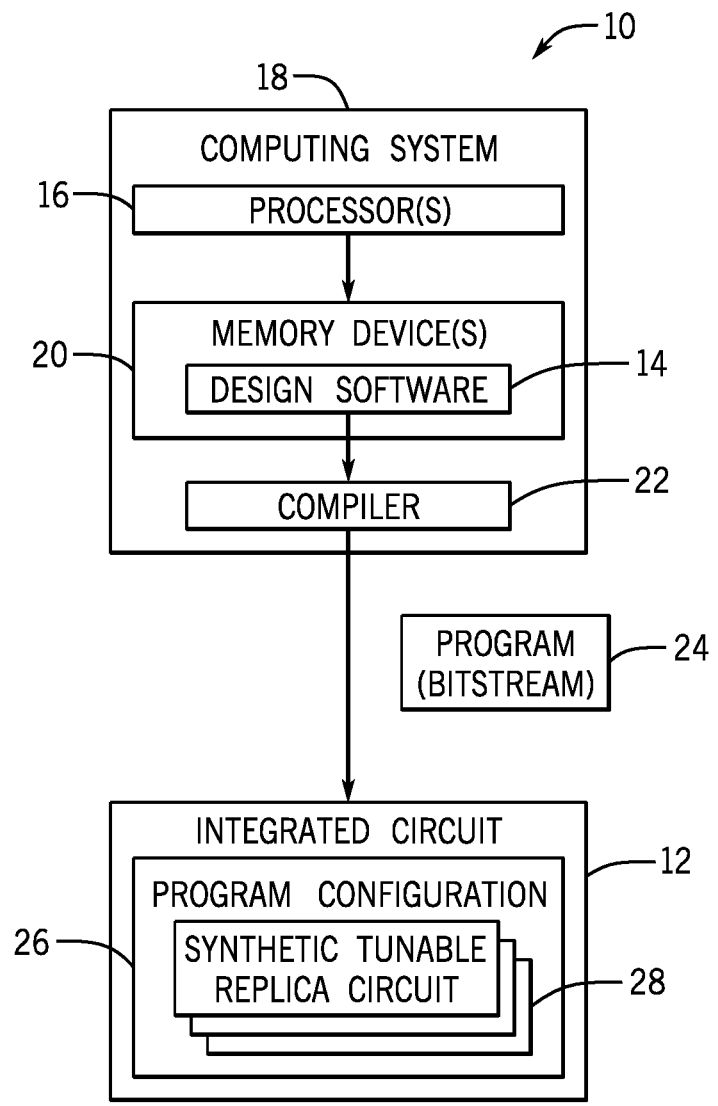
FIG. 1 illustrates a block diagram of a system that may reduce power consumption in each region of an integrated circuit based on a design programmed in the integrated circuit while providing sufficient speed to operate the integrated circuit, in accordance with an embodiment of the present disclosure.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

An integrated circuit consumes power when in operation, such as when implementing a design programmed in the integrated circuit. By consuming less power, the integrated circuit will be less expensive to operate. Moreover, less power consumption results in less heat dissipated, enabling the integrated circuit to operate at a cooler temperature. As a result, manufacturers may include more components on the integrated circuit and/or more tightly pack components on the integrated circuit. Furthermore, cooler operating temperatures increase the lifetime of the integrated circuit. Additionally, in cases where the power source of the integrated circuit is a battery, lower power consumption translates to longer battery life and/or smaller footprint of the battery (e.g., on a printed circuit board). In addition, by monitoring the STRCs during the operation of the user's circuit design, the integrated circuit may adjust the operation of different regions of the integrated design for improved performance. For example, the integrated circuit may raise the frequency of a region of the integrated circuit to a level that a corresponding STRC indicates that a respective critical path has an acceptable (e.g., less than a threshold) delay time. In addition, based on the behavior of the STRC, the integrated circuit may raise the voltage provided to a region of the integrated while using the corresponding STRC behavior indicate to the integrated circuit a range of frequencies that the region can support with the increased voltage.

An integrated circuit may be divided into multiple regions that may be designed to perform different operations. Because each region may be employed for different operations, each region of the integrated circuit may be programmed to use different circuit components (e.g., logic gates) to perform each respective operation. As a result, each respective region of the integrated circuit may have a different critical path as compared to other regions. The critical path of a particular region in the integrated circuit may correspond to the latency of the longest path (e.g., number and delay associated with used circuit components) in performing an operation within the respective region.

Since the critical path of an integrated circuit is not known at time of manufacture, it may be useful to assess or analyze the critical paths of a user's circuit design after the integrated circuit includes the user's circuit design. To analyze the behavior of critical paths in different regions of the integrated circuit and to improve the power efficiency and/or performance of a region of the integrated circuit, a synthetic tunable replica circuit (STRC) that is synthesized to mimic the critical path of the region may be incorporated into the integrated circuit and used to monitor the user's circuit design as implemented in the integrated circuit. In addition, the STRC may be used to calibrate the operation of the region while the region is performing its respective operation. That is, a regional control circuit or the like may monitor the performance of the STRC during the operation of region of the integrated circuit to determine whether the region can be operated using less voltage, an increased frequency, or the like. In one embodiment, the regional control circuit may refer to calibration data that indicates an expected operation of the region of the integrated circuit as a function of voltage, frequency, and temperature, as determined during calibration of the corresponding STRC. Based on the calibration data, the regional control circuit may adjust the operation (e.g., input voltage, frequency) of the region of the integrated circuit without knowledge of the current input voltage or temperature. As a result, the region of the integrated circuit may operate at improved performance, frequencies, and/or lower voltages, thereby improving the efficiency in which the integrated circuit operates. Additional details with regard to controlling the operations of various regions of an integrated circuit using STRCs will be discussed with reference to FIGS. 1-5 below.

With the foregoing in mind, FIG. 1 illustrates a block diagram of a system 10 that may reduce power consumption in each region of an integrated circuit 12 based on a design programmed in the integrated circuit 12, in accordance with an embodiment of the present disclosure. The integrated circuit 12 may be reconfigurable (e.g., a field programmable gate array (FPGA)). A user may implement a circuit design to be programmed onto the integrated circuit 12 using design software 14, such as a version of Quartus by Altera™.

The design software 14 may be executed by one or more processors 16 of a computing system 18. The computing system 18 may include any suitable device capable of executing the design software 14, such as a desktop computer, a laptop, a mobile electronic device, a server, and the like. The computing system 18 may access, configure, and/or communicate with the integrated circuit 12. The processor(s) 16 may include multiple microprocessors, one or more other integrated circuits (e.g., application specific integrated circuits, field programmable gate arrays, reduced instruction set processors, and the like), or some combination thereof.

One or more memory devices 20 may store the design software 14. In addition, the memory device(s) 20 may store information related to the integrated circuit 12, such as control software, configuration software, look up tables, configuration data, etc. In some embodiments, the processor(s) 16 and/or the memory device(s) 20 may be external to the computing system 18. The memory device(s) 20 may include a tangible, non-transitory, machine-readable-medium, such as a volatile memory (e.g., a random access memory (RAM)) and/or a nonvolatile memory (e.g., a read-only memory (ROM)). The memory device(s) 20 may store a variety of information and be used for various purposes. For example, the memory device(s) 20 may store machine-readable and/or processor-executable instructions (e.g., firmware or software) for the processor(s) 16 to execute, such as instructions to determine a speed of the integrated circuit 12 or a region of the integrated circuit 12, determine a criticality of a path of a design programmed in the integrated circuit 12 or a region of the integrated circuit 12, programming the design in the integrated circuit 12 or a region of the integrated circuit 12, and the like. The memory device(s) 20 may include one or more storage devices (e.g., nonvolatile storage devices) that may include read-only memory (ROM), flash memory, a hard drive, or any other suitable optical, magnetic, or solid-state storage medium, or any combination thereof.

The design software 14 may use a compiler 22 to generate a low-level circuit-design program 24 (bitstream), sometimes known as a program object file, which programs the integrated circuit 12. That is, the compiler 22 may provide machine-readable instructions representative of the circuit design to the integrated circuit 12. For example, the integrated circuit 12 may receive one or more programs 24 (bitstreams) that describe the hardware implementations that should be stored in the integrated circuit 12. The programs 24 (bitstreams) may programmed into the integrated circuit 12 as a configuration program 26.

In some embodiments, the configuration program 26 may include provisions for the hardware implementation of synthetic tunable replica circuits (STRCs) 28. As briefly discussed above, the STRCs 28 may include tunable replica circuits (TRCs) that include a number of logic circuit components (e.g., inverters, NAND, NOR, adders) that are tunable to some delay time. The STRCs 28 may be synthesized to replicate the critical path delay in different regions of the integrated circuit 12 and for different applications performed by one or more regions of the integrated circuit 12. The replicated critical paths of the STRCs may be effected by process variation and aging in the same manner as the critical paths present in the regions of the integrated circuit 12 that perform the user designed programming. As such, as the environment and aging of the user designed regions of the integrated circuit 12 changes, the behavior (e.g., delay) of the critical paths represented in the STRCs 28 may also change in a similar fashion.

With this in mind, in certain embodiments, the STRCs 28 are implemented into the integrated circuit 12 at various regions within the integrated circuit 12 based on the configuration program 26, which is created by a user. The STRCs 28 may mimic the delay times associated with different critical paths in the design program 24. As such, the STRCs 28 may be programmed into certain regions of the integrated circuit 12 that are adjacent to or with a close proximity of the regions of the integrated circuit 12 that include the hardware that corresponds to the design program 24. In this way, the critical paths of the actual design may be closely matched by the critical paths of the STRCs 28. Additional details with regard to the STRCs 28 and improving the operation of the integrated circuit 12 based on the STRCs 28 will be described below with reference to FIGS. 3-5.

Figure 2:
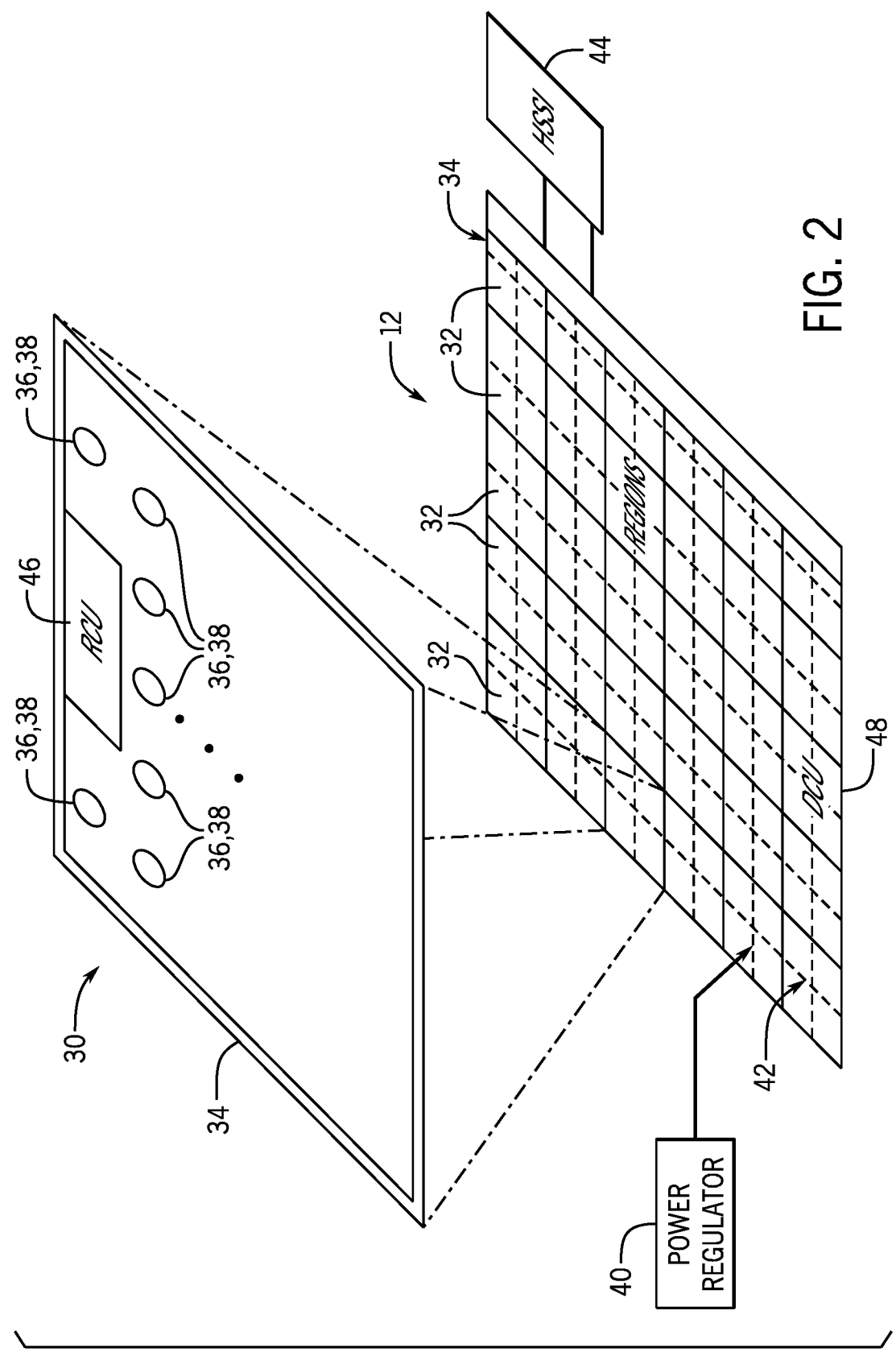
FIG. 2 is a diagram of a system that includes an integrated circuit, in accordance with an embodiment of the present disclosure.

FIG. 2 is a diagram of a system 30 that illustrates regions 32 of the integrated circuit 12 of FIG. 1, in accordance with an embodiment of the present disclosure. As illustrated, the integrated circuit 12 is a programmable circuit, such as a field programmable gate array device. In alternative embodiments, the integrated circuit 12 may be an application-specific integrated circuit, an application-specific standard part, a System-on-Chip, and the like. The system 30 may be used in any suitable application, such as a data center, network device, server, router, switch, gateway, firewall, bridge, hub, database, workstation, desktop computer, laptop computer, mobile device, wireless access point, wireless access device, and the like.

Interconnection resources 34 may be used to route signals, such as clock or data signals, through the integrated circuit 12. The integrated circuit 12 of FIG. 2, in one embodiment, may be a sectorized FPGA of the type described in U.S. Application No. 20160049941, "Programmable Circuit Having Multiple Sectors," which is incorporated by reference in its entirety for all purposes. As such programmable logic resources or blocks of the integrated circuit 12 may be distributed through a number of discrete programmable logic sectors or regions 32. Each programmable logic region 32 may include a number of programmable logic elements 36 having operations defined by configuration memory 38 (e.g., configuration random access memory). The programmable logic elements 36 may include combinational or sequential logic circuitry. For example, the programmable logic elements 36 may include look-up tables, registers, multiplexers, routing wires, and so forth. A user may program the programmable logic elements 36 to perform a variety of desired functions. A power or voltage regulator 40 (including a power supply) may provide a source of voltage and current to a power distribution network (PDN) 42 that distributes electrical power to the various components of the integrated circuit 12. Operating the circuitry of the integrated circuit 12 causes power to be drawn from the power distribution network 42. The integrated circuit 12 may include transceiver circuitry 44 (e.g., high speed serial interface circuitry) for driving signals off of the integrated circuit 12 and for receiving signals from other devices.

There may be any suitable number of programmable logic regions 32 on the integrated circuit 12. Indeed, while 29 programmable logic regions 32 are shown in FIG. 2, it should be appreciated that more or fewer may appear in an actual implementation (e.g., in some cases, on the order of 50 to 100 regions or more). Each programmable logic regions 32 may include a regional or sector control unit or circuit (RCU) 46 that controls the operation of the programmable logic region 32. Each regional control circuit 46 may be in communication with a device control unit or circuit (DCU) 48. Each regional control circuit 46 may accept commands and data from the device control circuit 48, and may read data from and write data into its configuration memory 38 based on control signals from the device control circuit 48. In addition to these operations, the regional control circuit 46 may be augmented with numerous additional capabilities. For example, such capabilities may include locally sequencing reads and writes to implement error detection and correction on the configuration memory 38 and sequencing test control signals to effect various test modes.

The regional control circuits 46 and the device control circuit 48 may be implemented as logic circuits, such as state machines and/or processors. For example, each operation of the regional control circuits 46 or the device control circuit 48 may be implemented as a separate routine in a memory containing a control program. This control program memory may be fixed in a read-only memory (ROM) or stored in a writable memory, such as random access memory (RAM). The ROM may have a size larger than would be used to store only one copy of each routine. This may allow each routine to have multiple variants depending on "modes" the local controller may be placed into. When the control program memory is implemented as random access memory (RAM), the RAM may be written with new routines to implement new operations and functionality into the programmable logic regions 32. This may provide usable extensibility in an efficient and easily understood way. This may be useful because new commands could bring about large amounts of local activity within the region at the expense of only a small amount of communication between the device control circuit 48 and the regional control circuits 46.

Each regional control circuit 46 thus may communicate with the device control circuit 48, which may coordinate the operations of the regional control circuits 46 and convey commands initiated from outside the integrated circuit 12. To support this communication, the interconnection resources 34 may act as a network between the device control circuit 48 and each regional control circuit 46. The interconnection resources 34 may support a wide variety of signals between the device control circuit 48 and each regional control circuit 46. In one example, these signals may be transmitted as communication packets.

The integrated circuit 12 may be electrically programmed. With electrical programming arrangements, the programmable elements 36 may include one or more logic elements (wires, gates, registers, etc.). For example, during programming, configuration data is loaded into the configuration memory 38 using pins and/or input/output circuitry (e.g., of the transceiver circuitry 44) of the integrated circuit 12. In one example, the configuration memory 38 may be implemented as configuration random-access-memory cells. The use of configuration memory 38 based on RAM technology is described herein is intended to be only one example. Moreover, configuration memory 38 may be distributed (e.g., as RAM cells) throughout the various programmable logic regions 32 the integrated circuit 12. The configuration memory 38 may provide a corresponding static control output signal that controls the state of an associated programmable logic element 36 or programmable component of the interconnection resources 34. The output signals of the configuration memory 38 may configure the may be applied to the gates of metal-oxide-semiconductor (MOS) transistors that control the states of the programmable logic elements 36 or programmable components of the interconnection resources 34.

Keeping the foregoing in mind, since programmable logic elements 36 are defined by a user for different integrated circuits 12, the critical paths of a particular region 32 of the integrated circuit 12 or a collection of regions 32 (e.g., executing an application) of the integrated circuit 12 are defined as a function of the user's design for the integrated circuit 12. Indeed, the critical paths of a user design include a mix of active and passive circuitry and may be affected by thermal hot spots, which may also be part of the user's design of the integrated circuit 12.

To reduce power consumption and improve performance margin of the integrated circuit 12, in some embodiments, the regional control circuit 46 may sweep the STRCs 28 across a number of clock frequencies, temperatures, and input voltages to calibrate or determine how the critical paths of the STRCs 28 behave under various operating conditions. The results of the calibration of the STRCs 28 may be stored in a memory cell or the like and may be used to predict the behavior of the regions 32 of the integrated circuit 12 during runtime or while the regions 32 are executing an application or operation. That is, based on the expected behavior of the critical paths of the regions 32 that correspond to the actual critical paths of the regions 32 that correspond to the user's design in the integrated circuit 12, the regional control circuit 46 may perform dynamic voltage and frequency scaling (DVFS) operations on the regions 32 that correspond to the user's design. By employing DVFS operations, the regional control circuit 46 may adjust the clock frequency or voltage input provided to the regions 32 based on the expected behavior of the regions 32, as provided in the calibration data. For instance, the regional control circuit 46 may collect current critical path delay information from the STRCs 28 and compare the information to the calibration data that indicates the expected behavior of the critical paths under a various input voltages and clock frequencies. If the calibration data indicates that the critical paths are expected to still be within a threshold (e.g., within one clock cycle of the expected delay, not violating setup times for a clock cycle) using a lower input voltage, the regional control circuit 46 may scale down the input voltage. In the same manner, the regional control circuit 46 may scale down or up the clock frequency provided to the regions 32 of the integrated circuit that correspond to the user's design to improve the performance of the respective operation. It should be noted that a hold time for the critical paths is solved at time of user's circuit design is synthesized with the corresponding STRCs to insure that the hold times are met over each operating corner.

Figure 3:
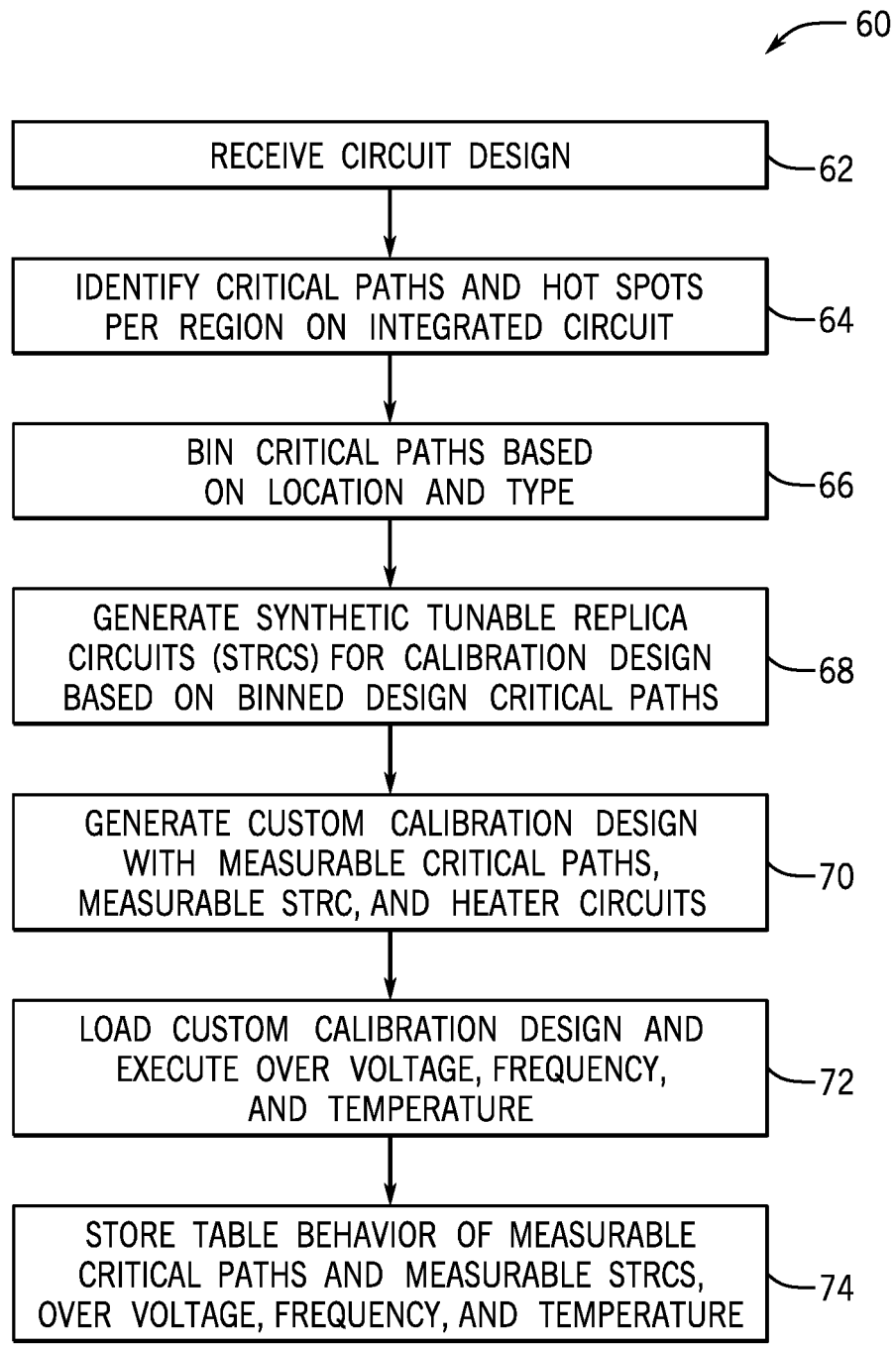
FIG. 3 is a flow chart of a method for calibrating synthetic tunable replica circuits (STRCs) within an integrated circuit, in accordance with an embodiment of the present disclosure.

With the foregoing in mind, FIG. 3 illustrates a flow chart of a method 60 for calibrating the critical paths of one or more regions of a user designed integrated circuits 12 using STRCs 28. Although the following description of the method 60 is described as being performed by the processor 16, it should be noted that any suitable control circuit or processor disposed in the integrated circuit 12 may perform the method 60. In addition, it should be understood that the method 60 may be performed in any suitable order and should not be limited to the order presented herein.

Referring now to FIG. 3, at block 62, the processor 16 may receive a user circuit design to implement in the integrated circuit 12. The user circuit design may detail the desired operations and functions of the integrated circuit 12.

Based on the user circuit design, the processor 16 (e.g., via Quartus) may analyze the corresponding resulting integrated circuit 12 to identify one or more critical paths that may be part of the integrated circuit 12. In certain embodiments, the processor 16 may identify the critical paths in each region 32 of the integrated circuit 12, the critical paths in one or more regions 32 of the integrated circuit 12 that corresponds to a particular application of the user circuit design, and the like. In addition to determining the critical paths, the processor 16 may also determine hot spots or locations within the integrated circuit 12 expected to increase in temperature and may affect the behavior of the identified critical paths.

After identifying the critical paths of the user circuit design, the processor 16 may bin the identified critical paths based on the location of the critical paths within each region 32 of the integrated circuit 12, a collection of regions 32 of the integrated circuit 12, and the like. Additionally, the identified critical paths may be binned based on the type (e.g., passive, active) of critical path.

Based on the binned critical paths, the processor 16 may, at block 68, generate one or more synthetic tunable replica circuits (STRCs) 28 to replicate the binned critical paths. As discussed above, the STRCs 28 may include circuit components that are matched to behave like the binned critical paths. Each STRC 28 may be tuned to track the sensitivity of a respective critical timing path with respect to an input voltage, a temperature of the integrated circuit 12 or a respective region 32 of the integrated circuit 12, aging of the critical timing path, and the like. Generally, different voltage inputs and clock frequency inputs provided to a critical path have different critical path responses due to different variations (e.g., RC delays) of corresponding circuit components in the respective critical path. The STRC 28 may tune the delay element of the critical path to match the expected delay of the critical path in the corresponding region 32 of the integrated circuit, as per the user's circuit design.

Figure 4:
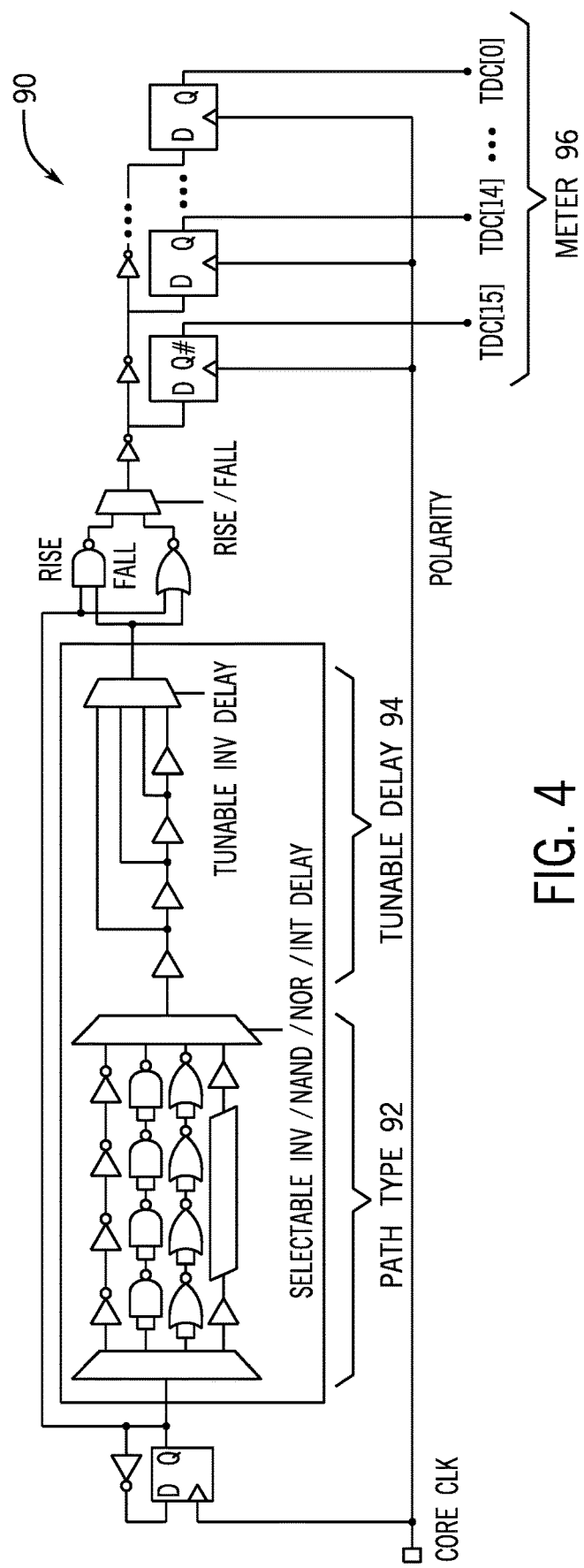
FIG. 4 is an example block diagram of a tunable replica circuit, in accordance with an embodiment of the present disclosure.

By way of example, FIG. 4 illustrates an overview of an example tunable replica circuit (TRC) 90. The TRC 90 may include a path type section 92 that may include a number of programmable logic elements 36, such as selectable inverters, NAND gates, NOR gates, INT gates, and the like to mimic the identified critical paths. The path type section 92 may be modified to include replica critical paths that match the critical paths of the user's circuit design. To fine tune the critical path delay, the TRC 90 may include a tunable delay section 94 to tune the delay time to more closely match the delay time of the identified critical path. The TRC 90 may also include a meter section 96 that may provide a bit value (e.g., 0-16 bits) that represents the current delay of the identified critical path. The meter section 96 may be used as a reference to determine whether the identified critical path delay is increasing or decreasing over time.

With the general components of the TRC 90 in mind, the processor 16 may generate the STRCs 28 in soft logic, such that each STRC 28 is created to match a set of critical paths and locations part of the user circuit design. In addition, the processor 16 may synthesize and pre-tune each STRC 28 to match a type of critical path and location in the user circuit design.

Referring back to FIG. 3, at block 70, the processor 16 may generate a custom calibration design for the user circuit design based on the STRCs 28 and the hot spot data. The custom calibration design may include measurable critical paths that are part of the user circuit design, measurable STRCs 28 that may be monitored with respect to adjustable voltage, temperature, and clock frequency, and heater circuits (e.g., oscillators). The custom calibration design may detail the critical paths of the user circuit design to be implemented into the integrated circuit 12, the corresponding STRCs 28 to replicate the critical paths of the user circuit design, and locations for heater circuits in the integrated circuit 12. The location of the heater circuits may correspond to the location of the expected hot spots of the integrated circuit 12, as determined at block 64. In addition, the STRCs 28 that are part of the custom calibration design may include one or more source registers that may toggle to control various input parameters (e.g., voltage, clock frequency).

At block 72, the processor 16 may load the custom calibration design and execute the user circuit design and the STRCs 28 over a voltage sweep, a clock frequency sweep, and a temperature sweep. The voltage sweep and the clock frequency sweep may be controlled using source registers coupled to the STRCs 28 and the regions 32 of the integrated circuit. The temperature sweep may be performed by using the heater circuits implemented in the integrated circuit 12. During the various sweeps, a control circuit (e.g., regional control circuit 46, device control circuit 48) may tune the critical paths of the STRCs 28 based on the behavior of the measurable critical paths of the user circuit design. That is, the control circuit may adjust the tunable delay section 94 of the STRCs 28 to match the measured delay of the critical paths of the user circuit design over the voltage, frequency, and temperature sweeps.

In addition to tuning the STRCs 28, the control circuit may record the behavior of the tuned critical paths of the STRCs 28 over the sweep of frequency. As such, the control circuit may identify when the critical path of the STRCs 28 exceeds a threshold (e.g., setup time violation of a critical path, more than a cycle delay with respect to expected delay time). The frequency limits determined by the control circuit may indicate an available frequency range that the respective region 32 of the integrated circuit 12 may operate effectively.

During the calibration sweeps, in certain embodiments, the STRCs 28 may be calibrated with respect to each region 32 of the integrated circuit 12, with respect to a particular application being executed by one or more regions 32 of the integrated circuit 12 or the like. As such, the resulting calibration of the STRCs 28 may be determine per region 32 and per application executable via the integrated circuit 12. Moreover, the calibration of the STRCs 28 may identify the highest frequency at a specific voltage and temperature that a region 32 may effectively operate. In the same manner, the calibration of the STRCs 28 may identify a lowest voltage or power at a specific frequency and temperature that a region 32 may effectively operate.

After performing the configuration sweeps, the control circuit may store the behavior of the STRCs 28 with respect to the measurable critical paths over various voltages, frequencies, and temperatures on different regions 32 of the integrated circuit 12 that may be used for the user circuit design. The measured behavior of the custom calibration design may then be transmitted to the processor 16.

At block 74, the processor 16 may receive the measured behavior of the custom calibration design and may store the results of the various calibration sweeps in a table (e.g., look up table) or other suitable memory component. The calibration table may be provided or stored on memory components for access by the control circuits to effectively manage the operations of the regions 32 of the integrated circuit 12 during runtime.

Since the location, types, and number of critical paths is dependent on the user circuit design, in some embodiments, the processor 16 may perform the method 60 automatically prior to or in addition to compiling each new user circuit design. As such, each calibrated integrated circuit 12 may include calibration data to assist the control circuitry to adjust operating parameters (e.g., voltage, frequency) of one or more regions 32 of the integrated circuit 12 to improve power efficiency, circuit performance, extend the end-of-life parameters, and the like.

Figure 5:
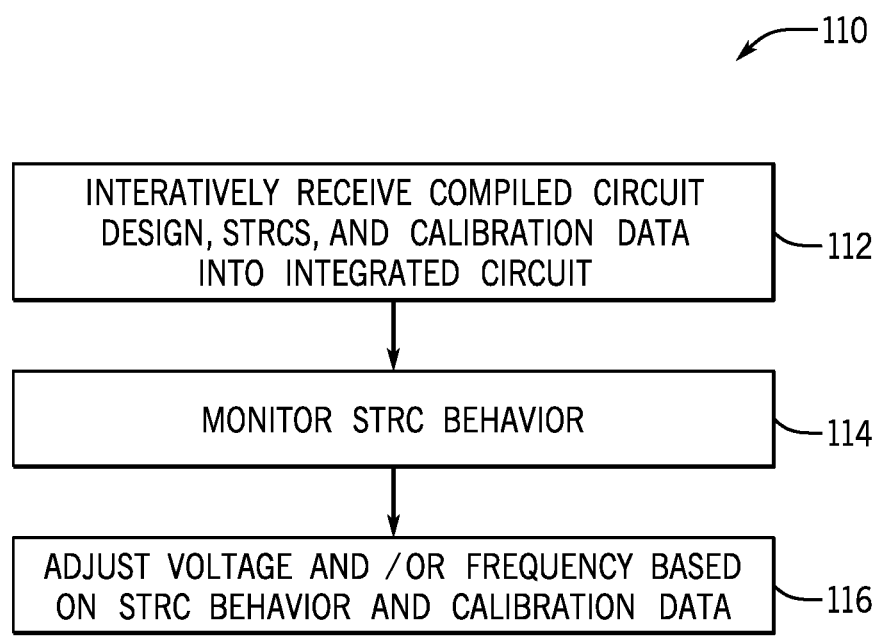
FIG. 5 is a flow chart of a method for adjusting operations of regions of an integrated circuit based on corresponding STRC behavior, in accordance with an embodiment of the present disclosure.

By way of example, FIG. 5 illustrates a method 110 for adjusting the operation of one or more regions 32 of the integrated circuit 12 based on the behavior of the corresponding STRCs 28 and the calibration data. Although the following description of the method 110 is described as being performed by the device control circuit 48, it should be noted that any suitable control circuit or processor may perform the method 110. In addition, although the following description of the method 110 is described as being performed in a particular order, it should be understood that the method 110 may be performed in any suitable order.

Referring now to FIG. 5, at block 112, the device control circuit 48 may iteratively receive complied data that includes a user circuit design, STRCs 28 generated to include critical paths that match the identified critical paths of the user circuit design, and the calibration data, discussed above with reference to FIG. 3. In certain embodiments, before sending the complied data, the processor 16 may iteratively compile the generated STRCs 28, the user circuit design, and the calibration data, and send the resulting program 24 to the integrated circuit 12. As a result, the device control circuit 48 may implement the user circuit design and the STRCs 28 into various regions 32 of the integrated circuit 12.

In certain embodiments, the device control circuit 48 may incorporate the STRCs 28 after the user circuit design has been implemented in the regions 32. That is, the device control circuit 48 may integrate the STRCs 28 into unused programmable logic elements 36 to peephole the STRCs 28 into certain regions 32 of the integrated circuit 12. In some embodiments, the device control circuit 48 may determine that the user circuit design and the STRCs 28 may not have fully been implemented by the integrated circuit 12 and thus may request that the processor 16 re-compile the user circuit design and the STRCs 28 until these components are integrated into the integrated circuit 12.

In addition to incorporating the user circuit design and the STRCs 28 into the integrated circuit 12, the device control circuit 48 may store the calibration data related to the characteristics of the behaviors of the STRCs 28 with respect to voltage, frequency, and temperature in a memory accessible to the device control circuit 48 during the operation of the applications programmed into the integrated circuit 12. The device control circuit 48 may employ the calibration data to improve the operation of the integrated circuit, as described below.

After the device control circuit 48 receives the complied data, the device control circuit 48 may begin operation of the user circuit design via the integrated circuit 12. During operation of the integrated circuit 12, at block 114, the device control circuit 48 may monitor the behavior of the various STRCs 28 disposed in the integrated circuit 12. As such, the device control circuit 48 may monitor the replica critical paths of the user circuit design during the operation (e.g., runtime) of the integrated circuit 12.

Based on the monitored behavior and the calibration data, at block 116, the device control circuit 48 may adjust the operating parameters (e.g., voltage and/or clock frequency) of one or more regions 32 of the integrated circuit 12. For example, if the calibration data indicates that monitored behavior of the critical path in a particular STRC 28 can increase its clock frequency by 20% and still remain operable, the device control circuit 48 may increase the clocking frequency to increase the speed in which the respective region 32 operates. As a result, the device control circuit 48 may adjust the operation of the region 32 with knowledge of the voltage provided to the respective region 32 or the temperature of the respective region 32. It should be noted that the device control circuit 48 may increase its clock frequency according to a step function (e.g., 1%), while monitoring the STRC. In this manner, the device control circuit 48 may iteratively increase the clock frequency until the clock frequency is increased to a maximum level without violating any set up times of critical paths.

In the same manner, the device control circuit 48 may iteratively adjust the voltage provided to a respective region 32 of the integrated circuit 12 and monitor the effect to the delay in the critical path of a corresponding STRC 28. In one embodiment, the meter section 96 of the STRC 28 may indicate whether the delay time increase or decreases. The device control circuit 48 may continue to adjust the voltage provided to the respective region 32 until the delay time of the critical path in the corresponding STRC 28 reaches some threshold.

By implementing one or more of the foregoing disclosed systems and techniques for adjusting the operating parameters of one or more regions 32 of the integrated circuit 12, the device control circuit 48 may identify a highest frequency that each region 32 or a collection of regions 32 of the integrated circuit 12 may operate to improve the performance of respective operations performed by the integrated circuit 12. Moreover, the device control circuit 48 may identify the lowest power (e.g., voltage) that each region 32 or a collection of regions 32 of the integrated circuit 12 may receive while maintaining the desired operations of the integrated circuit 12. As a result, the integrated circuit 12 may implement dynamic voltage and frequency scaling operations, which may assist the integrated circuit in achieving improved performance and power savings.

In addition, since the STRCs 28 are created in soft logic as a function of the user circuit design, each region 32 or collection of regions 32 (e.g., per application) may be calibrated against the critical paths that are specific to each individual user circuit design. That is, with respect to the embodiments described above, the processor 16 may identify a collection of regions 32 that perform a certain application on the integrated circuit 12 and may generate calibration data with respect to the critical paths of the application. The control circuitry of the integrated circuit 12 may then improve the power and performance efficiency of the application being executed on the integrated circuit 12 based on the calibration data.

Figure 6:
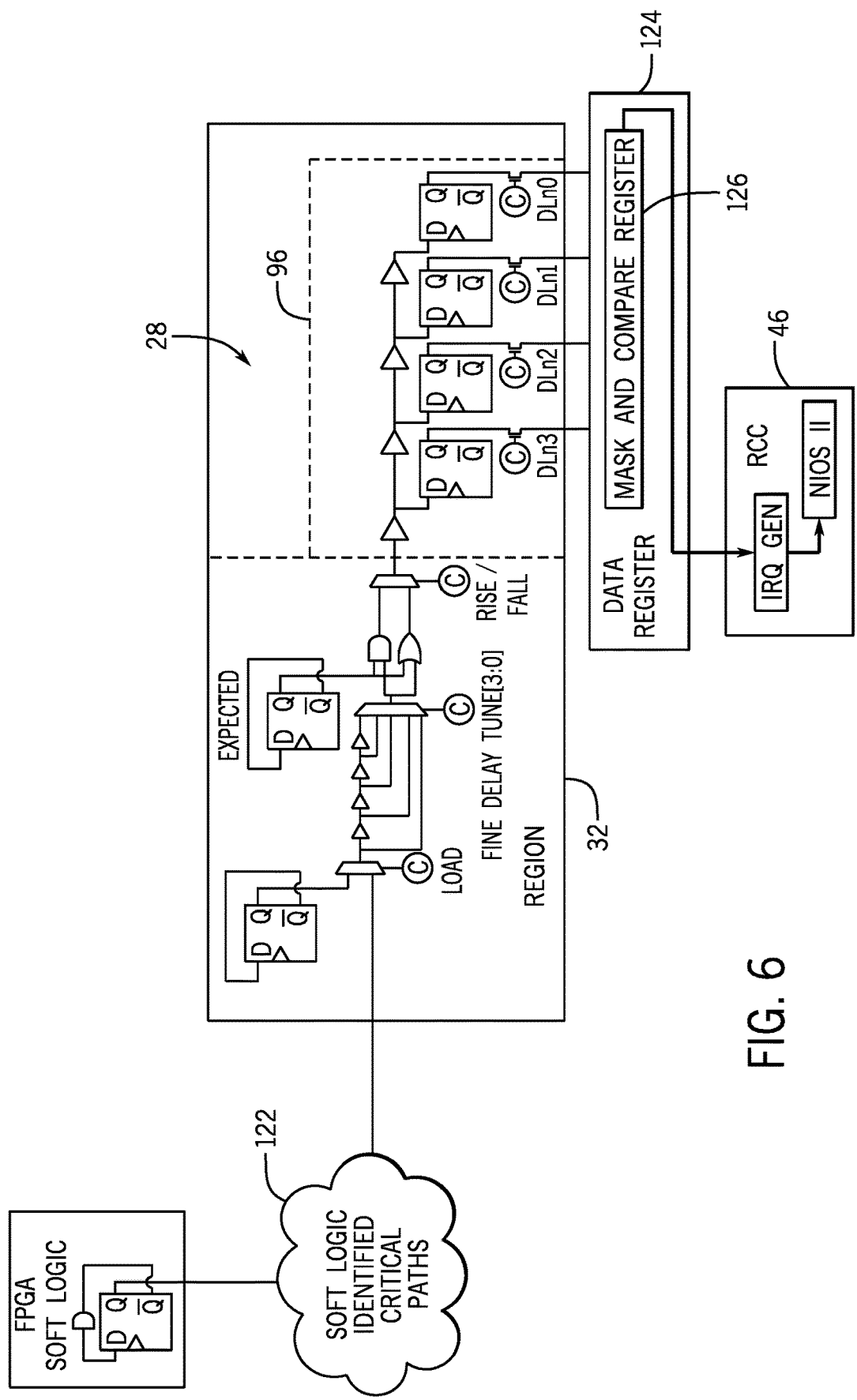
FIG. 6 is a block diagram illustrating hardened STRCs within an integrated circuit, in accordance with an embodiment of the present disclosure.

With the foregoing in mind, in certain embodiments, the STRCs 28 may be implemented with hardened endpoints in the integrated circuit 12. That is, referring to FIG. 6, the processor 16 may generate the STRCs 28 in soft logic 122 and a portion (e.g., path type section 92, tunable delay section 94) of the resulting STRC 28 may be incorporated into a particular region 32 or the like of the integrated circuit 12. The meter section 96 may be configured via available CRAM of the integrated circuit 12 and coupled to a data register 124 of the integrated circuit 12. The data register 124 may be part of the silicon or hardware component of the integrated circuit 12. As such, the end point of the STRC 28 may be implemented via hardware, as opposed to via soft logic or within programmable regions 32 of the integrated circuit 12. In some embodiments, the endpoints may be placed in programmable logic elements 36 (e.g., LAB) and thus be readily available in the integrated circuit 12. CRAM may then be used to choose which LABs the control circuit may monitor the endpoints. To reduce the total number of LABs to monitor, the generated STRCs 28 may be selected to be monitored via the CRAM.

The data register 124 may include a mask and compare register 126 that may perform certain logic functions, such as various arithmetic operations, compare operations, and the like. In one embodiment, the mask and compare register 126 may receive meter data indicative of the behavior (e.g., delay time) of the critical path of the STRC 28 via the meter section 96. The mask and compare register 126 may compare the behavior to a threshold and send an alert or command to the regional control circuit 46 or any other suitable control circuit in response to the behavior exceeding the threshold. The regional control circuit 46 may, in turn, adjust the operation of the corresponding region 32 of the integrated circuit that includes the user circuit design, remove power from the respective region 32, or the like.

Figure 7:
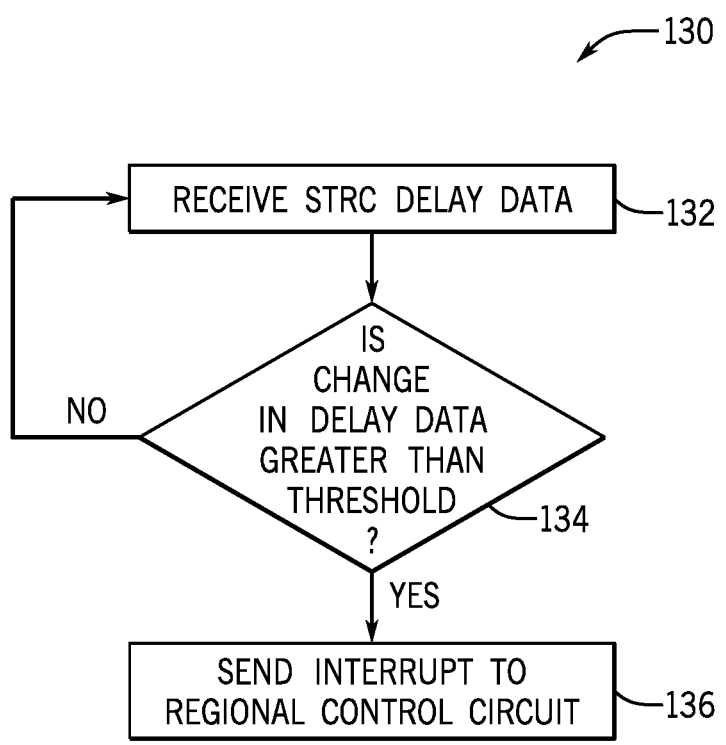
FIG. 7 is a flow chart of an example method for operating the hardened STRC of FIG. 5, in accordance with an embodiment of the present disclosure.

By way of example, FIG. 7 illustrates a flow chart of a method 130 for controlling the operation of one or more regions 32 of the integrated circuit 12 based on monitored behavior of corresponding STRCs 28. Although the following description of the method 130 is described as being performed by the mask and compare register 126, it should be understood that any suitable control circuit or processor may perform the method 130.

Referring to FIG. 7, at block 132, the mask and compare register 126 may receive critical path delay data from one or more STRCs 28 of the integrated circuit. At block 134, the mask and compare register 126 may determine whether a change in the delay data in the STRCs 28 is greater than some threshold. For example, if the change in the delay time for critical paths monitored in the STRCs 28 is greater than one cycle as compared to the previous measurement of the respective clock delay. The change in the delay time may be attributed to a number of factors, such as aging of circuit components, increase in ambient temperature, loose wiring or electrical connections within the integrated circuit 12, permanent denial of service (PDoS) attack, and the like. By way of example, a PDoS attack may be implemented by attempts to damaging the integrated circuit 12 thermally. In certain embodiments, the damage associated with a PDoS attack may be detected via the STRCs 28 when the STRCs 28 behave out of expected range. In one embodiment, upon detecting that the STRCs 28 is operating outside of an expected range, the mask and compare register 126 may continuously reduce the voltage and frequency of a corresponding region 32 of the integrated circuit 12 until the region 32 powers off, thus preventing further damage due to the PDoS attack.

If the change in delay time is not greater than the threshold, the mask and compare register 126 may return to block 132 and continue to receive the delay data from one or more STRCs 28. If, however, the change in delay time is greater than the threshold, the mask and compare register 126 may proceed to block 136. At block 136, the mask and compare register 126 may send an interrupt to the regional control circuit 46. The interrupt may cause the regional control circuit 46 to adjust the operating parameters of the respective regions 32, as described above, remove power from the respective regions 32, recalibrate the respective regions 32 with respect to the corresponding STRCs 28, and the like.

Circuit performance may degrade over time. To accommodate the degraded performance, margin may be maintained relative to the expected performance curve. This margin is typically called End of Life (EOL) margin. At the time of the calibration of the STRCs 28, EOL will not be accounted for because the STRC 28 may not age at the same rate as the actual critical paths the STRCs 28. By periodically executing the calibration design and re-sweeping voltage and temperature, the regional control circuit 46 or another suitable device may determine a new calibration of the STRCs 28 relative to the critical paths. As such, EOL margin may be reduced or eliminated for the integrated circuit 12. The rate of recalibration is a function of the aging differential and can be calculated on a per design per technology basis. The STRCs 28 can be activated at a higher rate to reduce this differential. A typical example may involve recalibration on the order of months to zero out the EOL margin.

With the foregoing in mind, in some embodiments, the regional control circuit 46 may recalibrate the respective regions 32 with respect to the corresponding STRCs 28 and adjust the operations of the regions 32 in accordance with the recalibrated results. In this way, the integrated circuit 12 may effectively extend its end of life (EOL) parameters, and, in some circumstances, remove the EOL parameters associated with the integrated circuit 12.

In some embodiments, in addition to determining whether the delay time is greater than the threshold, the mask and compare register 126 may determine first order and second order derivatives for the change in delay times of the STRCs 28. Using the first order and second order derivatives, the mask and compare register 126 may predict whether the critical paths of the STRCs 28 will exceed a threshold based on the rate of change. As such, the mask and compare register 126 may improve the control loop response time by evaluating the first order and second order derivatives.

Although the foregoing description of the method 130 is described as being performed by the mask and compare register 126, as mentioned above, the method 130 may be performed by any suitable control circuit or processor. In addition, the method 130 may be used in conjunction with the other methods described herein to initiate recalibration of the STRCs 28, power down regions 32 of the integrated circuit 12, adjusting operating parameters of the regions 32 of the integrated circuit 12 in response to the change of delay time exceeding some threshold.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
   a processor configured to:
   receive circuit design data;
   identify one or more critical paths of the circuit design data;
   generate one or more synthetic tunable replica circuits (STRCs) in soft logic configured to mimic the one or more critical paths; and
   compile the circuit design data and the one or more STRCs into program data, wherein the program data is configured to be transmitted to an integrated circuit comprising a control circuit configured to:
      program a plurality of programmable logic regions of integrated circuit to implement the circuit design data and the one or more STRCs;
      adjust one or more operating parameters of at least one of the plurality of programmable logic regions based on the one or more STRCs;
      monitor one or more properties of the one or more STRCs; and send an interrupt signal in response to the one or more properties exceeding a threshold, wherein the interrupt is configured to cause the second control circuit to adjust an operation in the integrated circuit.

2. The system of claim 1, the control circuit is configured to:
implement the circuit design data into a first subset of the plurality of programmable logic regions, wherein a first set of critical paths associated with the circuit design data is part of a portion of the first subset of the plurality of programmable; logic regions; and
implement at least one of the one or more STRCs into a second subset of the plurality of programmable logic regions based on a location of the portion of the first subset of the plurality, of programmable logic regions.

3. The system of claim 1, wherein the processor is configured to determine one or more programmable logic regions of the plurality of programmable logic regions to place the one or more STRCs using soft logic.

4. The system of claim 1, wherein the program data is configured to cause the circuit design data to be implemented using a first portion of the plurality of programmable logic regions and the one or more STRCs to be implemented using a second portion of the plurality of programmable logic regions, wherein the first portion and the second portion are different from each other.

5. The system of claim 1, wherein second portion of the plurality of programmable logic regions comprises unused logic.

6. The system of claim 1, wherein the control circuit is configured to:
monitor one or more delay times of the one or more STRCs; and
adjust the one or more operating parameters of the at least one of the plurality of programmable logic regions based on the delay times.

7. The system of claim 1, wherein the one or more operating parameters
comprises an input voltage, a clock frequency, or both.

8. The system of claim 1, wherein the one or more STRCs comprises at least one hardened endpoint in the integrated circuit.

9. The system of claim 1, wherein adjusting the operation in the integrated circuit comprises removing power from one or more of the plurality of programmable logic regions of the integrated circuit, recalibrating the one or more of the plurality of programmable logic regions of the integrated circuit with respect to the STRCs, or both.

10. An integrated circuit, comprising:
a control circuit configured to:
receive calibration design data from a processor, wherein the calibration design data comprises:
one or more measurable critical paths associated with circuit design data related to the integrated circuit;
one or more measurable synthetic tunable replica circuits (STRCs) generated in soft logic configured to mimic the one or more measurable critical paths; and
one or more heater circuits;
program the one or more STRCS into a plurality of programmable logic regions of the integrated circuit to implement the calibration design data;
generate a calibration table comprising:
a first set of measurements of the one or more measurable STRCs over a voltage sweep, frequency sweep, a temperature sweep, or any combination thereof; and
a second set of measurements of the one or more measurable critical paths over the voltage sweep, frequency sweep, a temperature sweep, or any combination thereof;
tune one or more parameters of the one or more measurable STRCs based on the calibration table;
monitor one or more properties of the one or more STRCs; and
send an interrupt signal in response to the one or more properties exceeding a threshold, wherein the interrupt is configured to cause the second control circuit to adjust an operation in the integrated circuit.

11. The integrated circuit of claim 10, wherein the first set of measurements and the second set of measurements are associated with one of a plurality of programmable logic regions of the integrated circuit.

12. The integrated circuit of claim 10, wherein the first set of measurements and the second set of measurements are associated with a plurality of programmable logic regions of the integrated circuit.

13. The integrated circuit of claim 12, wherein the plurality of programmable logic regions of the integrated circuit is configured to execute an application via the integrated circuit.

14. The integrated circuit of claim 10, wherein the control circuit is configured to generate the calibration table in response to the integrated circuit receiving power.

15. The integrated circuit of claim 10, wherein the control circuit is configured to:
implement the circuit design data in a first plurality of programmable logic regions of the integrated circuit;
implement one or more STRCs having the one or more parameters in a second plurality, of programmable logic regions of the integrated circuit; and
adjust one or more clocking frequencies of the one or more STRCs based on the calibration table.

16. The integrated circuit of claim 15, wherein the control circuit is configured to:
monitor one or more delay times associated with the one or more STRCs; and
generate a second calibration table in response to at least one of the one or more delay times exceeding a threshold.

17. The integrated circuit of claim 10, wherein adjusting the operation in the integrated circuit comprises removing power from one or more of the plurality of programmable logic regions of the integrated circuit, recalibrating the one or more of the plurality of programmable logic regions of the integrated circuit with respect to the STRCs, or both.

18. A method, comprising:
monitoring, via a first control circuit, one or more properties of one or more synthetic tunable replica circuits (STRCs) configured to mimic one or more critical paths of a circuit design for an integrated circuit; and
sending, via the first control circuit, an interrupt to a second control circuit in response to the one or more properties exceeding a threshold, wherein the interrupt is configured to cause the second control circuit to adjust an operation in the integrated circuit.

19. The method of claim 18, wherein the one or more properties comprise:
one or more changes in delay times associated with the STRCs;

a first order derivative of the one or more changes; or a second order derivative of the one or more changes.

20. The method of claim 18, wherein the operation comprises recalibrating the one or more STRCs with respect to the one or more critical paths, thereby extending or removing end of life (EOL) parameters associated with the integrated circuit.

21. The method of claim 18, wherein the threshold is associated with a permanent denial of service (PDoS) attack on the integrated circuit.

* * * * *